J. W. EAST.
MOTOR.
APPLICATION FILED FEB. 28, 1910.
987,707.
Patented Mar. 28, 1911.
2 SHEETS—SHEET 2.
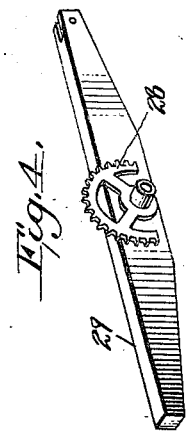
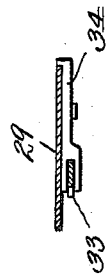
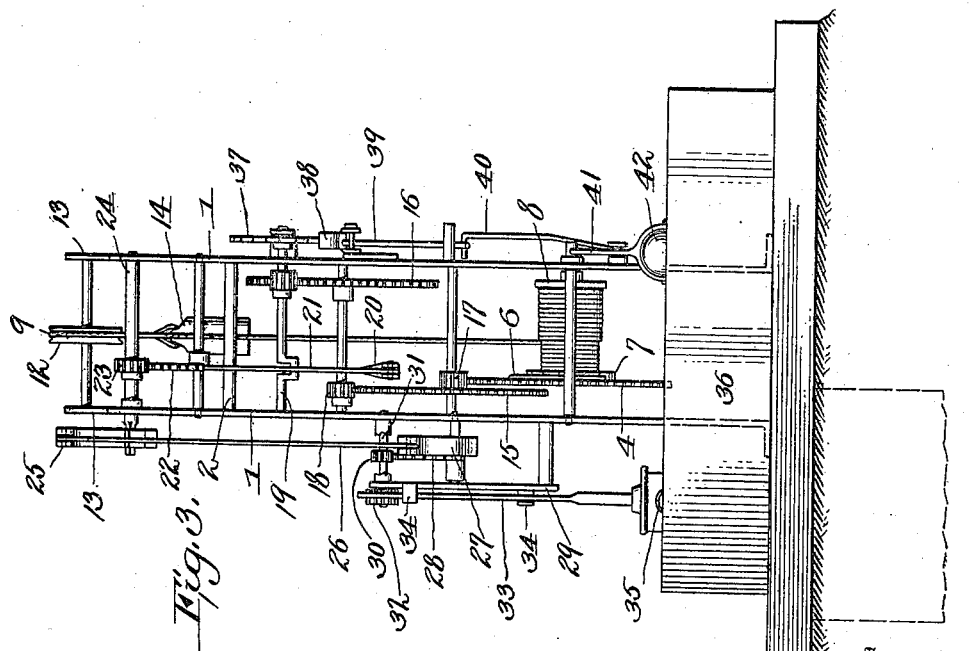
Witnesses
Oliver W. Holmes
R. W. Bishop
Inventor
J. W. East
By E. G. Siggers
Attorney

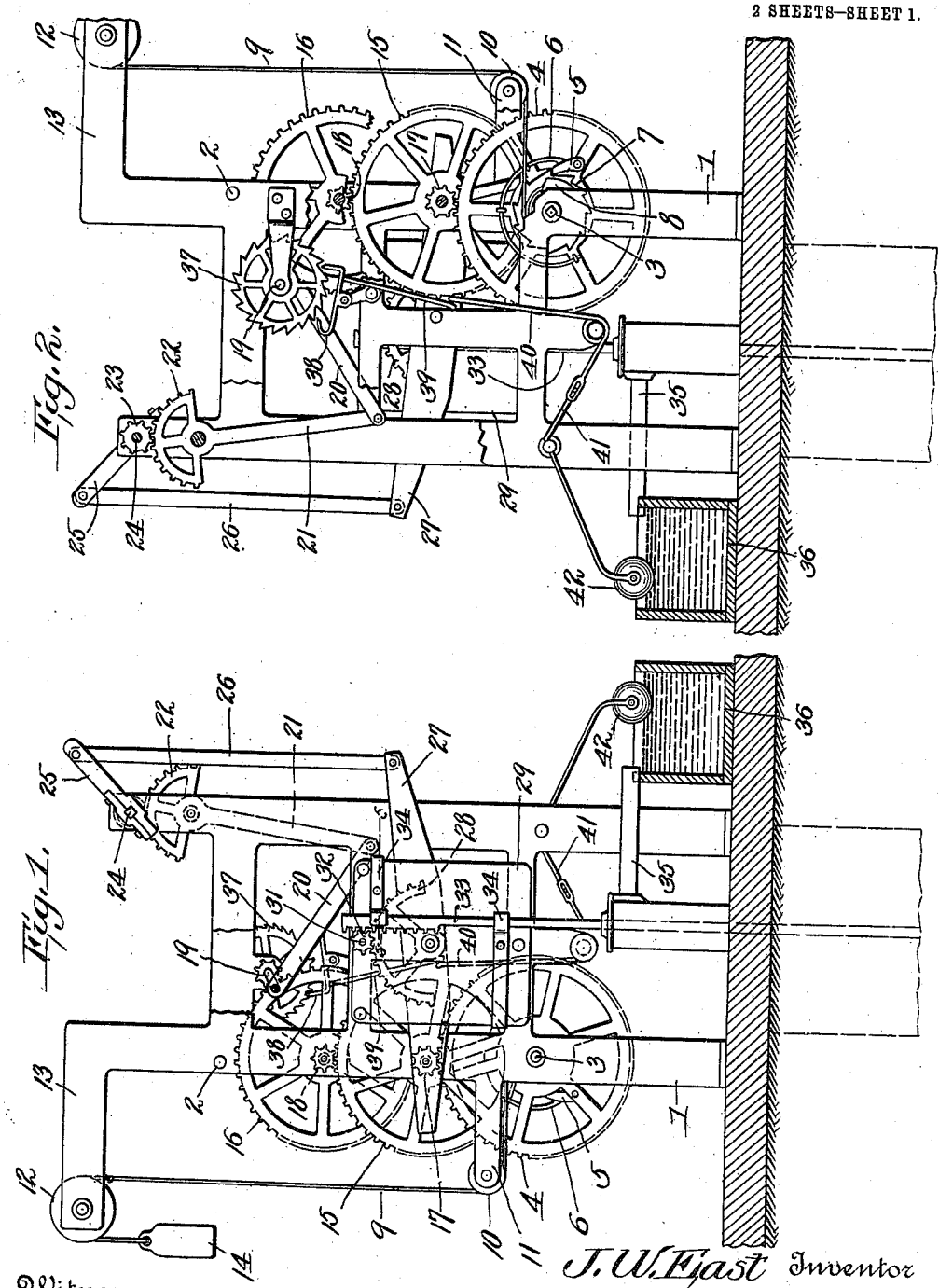

UNITED STATES PATENT OFFICE.

JAMES WILLIAM EAST, OF RAPHINE, VIRGINIA.

MOTOR.

987,707. Specification of Letters Patent. Patented Mar. 28, 1911.

Application filed February 28, 1910. Serial No. 546,402.

*To all whom it may concern:*

Be it known that I, JAMES W. EAST, a citizen of the United States, residing at Raphine, in the county of Rockbridge and State of Virginia, have invented a new and useful Motor, of which the following is a specification.

This invention has for its object the provision of a simple and efficient motor for operating pumps, which will be found an effective substitute for the ordinary windmill and which may be operated at any time, irrespective of the condition of the wind. This object is attained by the use of the mechanism illustrated in the accompanying drawings, and the invention consists in certain novel features of the same, as will be hereinafter first fully described and then particularly pointed out in the claims.

In the drawings, Figure 1 is a side elevation of a mechanism embodying my invention. Fig. 2 is a similar view looking at the opposite side of the apparatus. Fig. 3 is an end elevation. Fig. 4 is a detail perspective view of the walking beam. Fig. 5 is a detail horizontal section showing the guide for the vertical reciprocatory rack bar.

In carrying out my invention, I erect a pair of frames 1 which are connected by suitable bracing bolts 2 in spaced relation adjacent the mouth of a well. Between the side frames 1, I arrange a driving shaft 3 which has its ends journaled in the said frames and carries a gear wheel 4 on the side of which is pivoted a pawl 5 normally pressed by a spring 6 into engagement with a ratchet disk 7 on the end of a drum 8, which is secured on the said driving shaft. A cable 9 is wound on the said drum and extends therefrom to a pulley or guide roller 10 at the outer end of an arm 11 projecting from the main frame, and then extends up to and over a second pulley or guide roller 12 on the end of an arm 13 at the upper end of the frame, a weight 14 being attached to the end of the cable, as clearly shown in Fig. 1, whereby the dropping of the weight will unwind the cable and thereby impart motion to the drum which will, in turn, be transmitted through the ratchet disk 7 and pawl 5 engaging the same, to the gear wheel 4 from which it will be transmitted to the mechanism to be driven. The rotation of the gear wheel 4 is transmitted through a train of gearing comprising spur wheels 15 and 16 and pinions 17 and 18 to a crank shaft 19, mounted between the upper portion of the side frames, the said crank shaft being provided with a pinion meshing with the spur gear 16 and being connected by a link 20 with the lever arm 21 of the segmental gear 22, which is pivotally mounted between the side frames, as clearly shown. This segmental gear 22 meshes with a pinion 23 on a rock-shaft 24 journaled in the side frames above the gear and provided at one end with a crank arm 25, to the end of which is pivoted the upper end of a connecting rod 26 having its lower end pivoted to one end of a walking beam or lever 27 at the center of which is secured a segmental gear or rack 28, the center of the said rack being the pivot of the walking beam which pivot extends between one of the side frames 1 and the supplemental frame 29 secured to the said side frame. This segmental gear or rack 28 meshes with a pinion 30 on a shaft 31 journaled in the side frame 1 and the supplemental frame 29 and provided with a pinion 32 on its end outside the supplemental frame, the said pinion 32 meshing with a rack bar 33 disposed vertically in suitable guides 34 on the supplemental frame and connected to or forming a part of the pump rod by which water is drawn from the well and discharged through the spout 35 into a trough 36.

On one end of the crank shaft 19 is a scape wheel 37 which is engaged by a pallet 38 mounted on the frame below the said wheel and adapted to oscillate so as to engage the said scape wheel and regulate the movement of the same and prevent a too-rapid descent of the operating weight 14. A stop arm 39 depends from the pallet 30 and oscillates freely as the said pallet operates. Upon the frame below the said depending stop arm is a brake lever 40 which has one end projecting upward in the path of the said depending stop arm 39 and has its other arm flexibly connected with one end of an angle lever 41 fulcrumed upon the frame and having its other end disposed over the tank and carrying a float 42 adapted to ride on the water within the trough.

The construction and arrangement of the several parts of the device being thus made known, it is thought the operation of the same will be readily understood and appreciated. The main driving shaft is rotated by means of any ordinary crank handle so as to wind the cable 9 and, consequently, raise the weight to its highest position. Should the trough 36 be filled with water, the float 42 will be at its highest point and the inner end of the lever 41 will, consequently, be depressed so as to hold the upper end of the brake lever 40 against the lower end of the stop arm 39 and, therefore, prevent vibration of the pallet 38 so that the scape wheel 37 cannot rotate and the mechanism will not operate. As the water in the trough is used and the level of the same falls, the float will descend and will thereby vibrate the lever 41 so that the inner end of the same will lift the lower end of the brake lever 40 and swing the upper end of the same away from the stop arm 39 so that the pallet will be free to vibrate and, consequently, the several gear wheels may rotate under the influence of the weight 14 applied through the drum and the ratchet wheel on the end of the same to the main gear wheel 4. The rotation of this gear wheel will be transmitted through the train of gearing to the crank shaft 19, and the link 20 will follow the movement of the said crank shaft so as to vibrate the lever arm 21 and the segmental gear 22 carried thereby. The vibration of the segmental gear 22 will be imparted directly to the pinion 23 and the rock shaft 24 will be oscillated, so that the crank arm 25 thereon will be given an up and down movement. This movement of the crank arm 25 will be transmitted through the connecting rod 26 to the walking beam 27, so that the curved rack 28 thereon will be caused to act on the pinion 30 and vibrate the shaft 31 so that the pinion 32 on said shaft will reciprocate the rack bar 33 and, consequently, operate the pump. As the trough fills, the float will rise and, therefore, actuate the brake lever 40 so as to throw the free end of the same against the end of the stop arm 39 and again arrest the movement of the pallet 38 so that the pumping action will cease until the water is again used from the trough.

The several parts of my device are compactly arranged and a single winding of the cable will suffice to operate the motor for a considerable period of time. Inasmuch as the power of the walking beam is transmitted to the pump rod approximately at the center of the walking beam through the provision of the curved rack 28, the mechanism will operate very smoothly and with practically no loss of power. The use of the segmental gear transmits the movement of the driving wheel and converts the rotary movement of the same into a reciprocating movement without loss of power and without causing any jarring of the operating parts.

Having thus described the invention, what I claim as new, and desire to secure by Letters Patent, is—

1. In a mechanical motor, the combination of a driving shaft, a walking beam having a segmental gear disposed at its center concentric with its pivot, gearing connecting the walking beam with the driving shaft, means for actuating the driving shaft, a shaft disposed above the walking beam, a pinion on the said shaft meshing with the segmental gear on the walking beam, a second pinion on the outer end of said shaft, and a vertically-disposed rack bar meshing with the said pinion.

2. In a mechanical motor, the combination of a driving shaft, means for actuating the said shaft, a rock shaft, gearing connecting the driving shaft with the said rock shaft, a crank arm on the outer end of the said rock shaft, a walking beam disposed below the said rock shaft, a connecting rod connecting the end of the said crank arm with one end of the walking beam, a segmental gear on the walking beam, and a working shaft actuated by the said segmental gear.

3. The combination of a driving shaft, a crank shaft actuated by the driving shaft, means for actuating the driving shaft, a scape wheel on the crank shaft, a pallet mounted below the said scape wheel and engaging the same, a stop arm depending from the said pallet, a brake lever arranged below the said stop arm and having one end arranged adjacent and in the path of the end of the stop arm to bear against the side of said arm, and a float-controlled lever flexibly connected with the brake lever.

4. The combination of a driving shaft, a crank shaft, gearing connecting the driving shaft with the crank shaft, means for actuating the driving shaft, a rock shaft, a pinion on the rock shaft, a segmental gear pivoted below the rock shaft and meshing with the pinion thereon, a lever arm depending from said segmental gear, a link connecting the lower end of said lever arm with the crank shaft, a walking beam pivotally mounted below the crank shaft and having a central upstanding gear disposed concentric with its pivot, a crank arm on the rock shaft, a connecting rod having its upper end pivoted to the end of said crank arm and its lower end pivoted to one end of the walking beam, a pump rod having a rack bar on one side, and a shaft between the walking beam and said rack bar provided with two pinions, one of said pinions meshing with the rack bar and the other pinion meshing with the gear on the walking beam.

In testimony, that I claim the foregoing as my own, I have hereto affixed my signature in the presence of two witnesses.

JAMES WILLIAM EAST.

Witnesses:
J. P. MOORE,
A. T. SHIELDS.

Copies of this patent may be obtained for five cents each, by addressing the "Commissioner of Patents, Washington, D. C."